(12) United States Patent
Phillis et al.

(10) Patent No.: US 9,346,318 B2
(45) Date of Patent: May 24, 2016

(54) SYSTEM AND METHOD FOR A WHEEL LOCK RING ASSEMBLY

(71) Applicant: Goodrich Corporation, Charlotte, NC (US)

(72) Inventors: Robert Lee Phillis, Covington, OH (US); Scott Whittle, Springsboro, OH (US); Rick Brown, Huber Hgts, OH (US)

(73) Assignee: Goodrich Corporation, Charlotte, NC (US)

( * ) Notice: Subject to any disclaimer, the term of this patent is extended or adjusted under 35 U.S.C. 154(b) by 614 days.

(21) Appl. No.: 13/851,368

(22) Filed: Mar. 27, 2013

(65) Prior Publication Data

US 2014/0292060 A1 Oct. 2, 2014

(51) Int. Cl.
*B60B 15/00* (2006.01)
*B60B 25/18* (2006.01)
*B60B 25/08* (2006.01)
*B60B 25/12* (2006.01)

(52) U.S. Cl.
CPC ............... *B60B 15/00* (2013.01); *B60B 25/18* (2013.01); *B60B 25/08* (2013.01); *B60B 25/12* (2013.01); *Y10T 29/49494* (2015.01)

(58) Field of Classification Search
CPC ........ B60B 15/00; B60B 25/18; B60B 25/12; B60B 25/08; Y10T 29/49494
USPC ................. 152/396, 401, 406, 409, 410, 411, 152/DIG. 10; 301/11.1, 23, 35.3, 35.51, 301/41.1; 244/103 H
See application file for complete search history.

(56) References Cited

U.S. PATENT DOCUMENTS

| | | | | |
|---|---|---|---|---|
| 2,894,556 A | * | 7/1959 | Darrow ................... | B60B 25/22 152/410 |
| 4,369,826 A | * | 1/1983 | Hendrickson ........... | B60C 29/02 152/410 |
| 4,401,144 A | * | 8/1983 | Wilde ..................... | B60C 17/04 152/158 |
| 4,407,348 A | * | 10/1983 | Suckow .................. | B60B 25/14 152/410 |
| 4,438,797 A | * | 3/1984 | Suckow .................. | B60B 25/22 152/410 |
| 4,635,695 A | * | 1/1987 | Frank ...................... | B60B 25/18 152/410 |

(Continued)

FOREIGN PATENT DOCUMENTS

| | | |
|---|---|---|
| EP | 142058 | 5/1985 |
| GB | 2491674 | 12/2012 |

OTHER PUBLICATIONS

Extended Search Report and Written Opinion dated Oct. 8, 2014 in European Application No. 14161602.9.

*Primary Examiner* — S. Joseph Morano
*Assistant Examiner* — Jean Charleston
(74) *Attorney, Agent, or Firm* — Snell & Wilmer L.L.P.

(57) ABSTRACT

Systems and methods disclosed herein may be useful for use in a wheel assembly. In this regard, a wheel assembly is provided comprising a wheel base having a side rim disposed about a circumference of the wheel base, and a lock ring disposed within a cavity between the wheel base and the side rim. An air seal may be disposed between the wheel base and the inside surface of the side rim. Lock ring has two non-contiguous surface contacts with the wheel base and two non-contiguous surface contacts with the side rim each enabling various torque paths of lock ring.

19 Claims, 13 Drawing Sheets

(56) References Cited

U.S. PATENT DOCUMENTS

| | | | | |
|---|---|---|---|---|
| 4,721,142 A | * | 1/1988 | Foster | B60B 25/18 152/410 |
| 5,259,430 A | * | 11/1993 | Smith | B60B 25/18 152/409 |
| 5,947,175 A | | 9/1999 | Watanabe | |
| 6,152,541 A | * | 11/2000 | Huber | B62K 25/02 301/124.2 |
| 7,625,030 B2 | * | 12/2009 | Bieker | B60B 17/0006 188/33 |
| 7,819,154 B2 | * | 10/2010 | Durif | B60B 25/12 152/409 |

* cited by examiner

SYSTEM AND METHOD FOR A WHEEL LOCK RING ASSEMBLY

FIELD

The present disclosure is related to a lock ring assembly for use in, for example, an aircraft wheel.

BACKGROUND

Aircraft wheels often comprise a wheel base, a side rim, and a lock ring. The wheel base is typically coupled to the aircraft brake for applying torque to cause the aircraft to decelerate. The side rim is typically coupled about a circumference of the wheel base and is often at least partially in contact with a tire. A lock ring is typically placed in between the wheel base and the side rim for retaining the side rim to the wheel base and transferring torque from the wheel base to the side rim. However, in systems having large wheel bases (e.g., 19 inches (48.26 centimeters) in diameter or greater), high torque at application speed may lead to a wheel-skid. A wheel-skid is an event in which the tire and side rim continue to roll at ground speed, while the wheel base is locked to the brake and not rotating. A wheel-skid is in contrast to a tire-skid, where the tire is stationary, and sliding, relative to the runway. A lock ring that has not been designed to address this concern may lead to a wheel skid.

SUMMARY

The present disclosure relates to an improved lock ring assembly designed to address, among other things, the aforementioned deficiencies in prior art lock ring assemblies. The side rim is disposed about the wheel base and includes an inside surface and a recess formed on the inside surface. An air seal is disposed between the wheel base and the inside surface of the side rim. A locking mechanism secures the side rim onto the wheel base and prevents the side rim from sliding axially off the wheel base.

According to various embodiments, a wheel assembly is disclosed herein. This wheel assembly may include a wheel base, a side rim disposed about a circumference of the wheel base and including an inside surface and a recess formed on the inside surface, an air seal disposed between the wheel base and the inside surface of the side rim, and a locking mechanism. The locking mechanism may be configured to secure the side rim onto the wheel base to prevent the side rim from sliding axially off the wheel base. The locking mechanism may comprise discrete, non-contiguous interfaces with interior surfaces of the wheel base and the side rim. The locking mechanism may comprise, for example, four discrete non-contiguous interfaces with interior surfaces of the wheel base and the side rim.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

Figure 1:
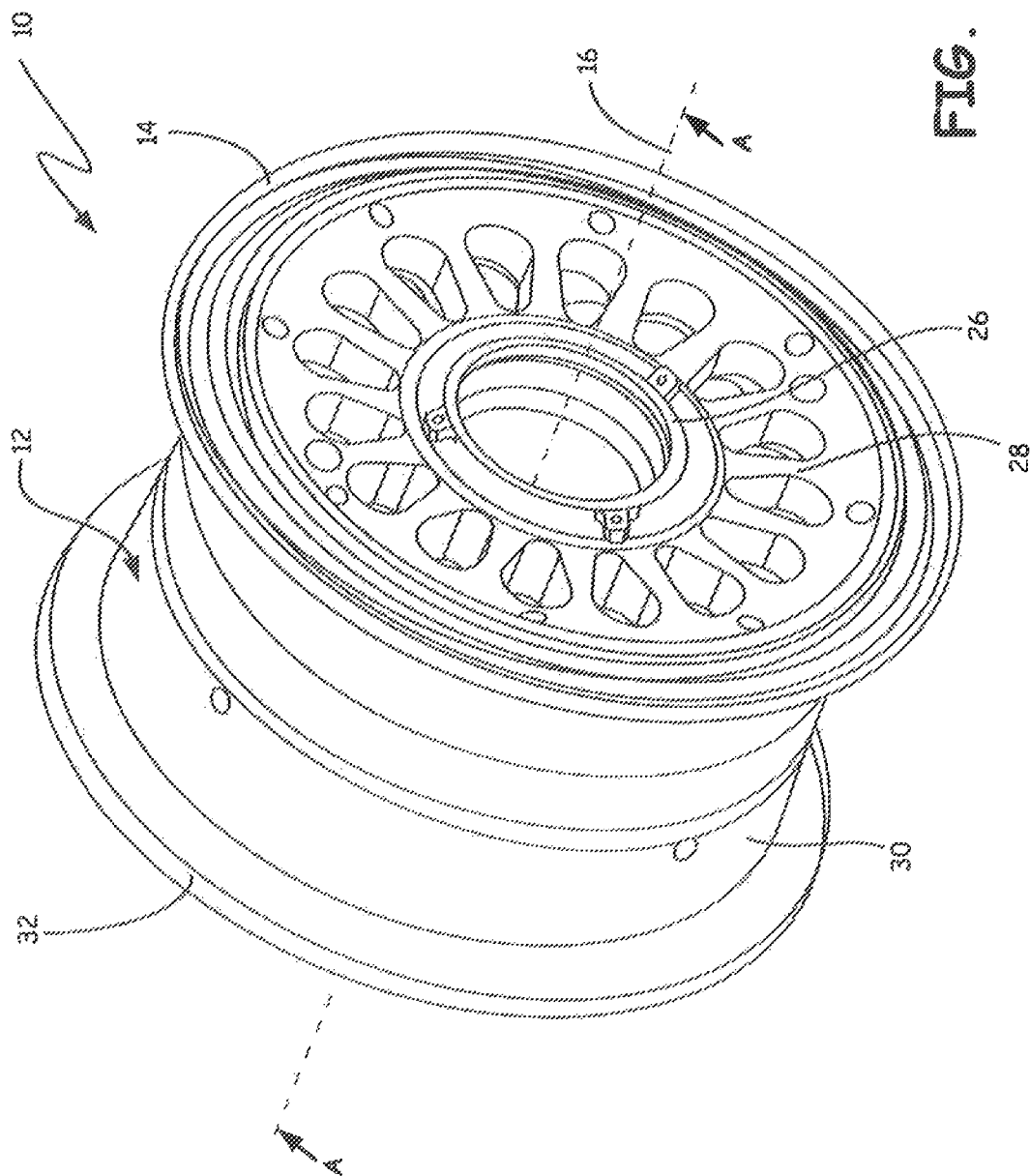
FIG. 1 illustrates a wheel assembly, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Wheel skids may occur where high torque change rates and/or high torque magnitudes are used. Stated another way, when the rate of torque application changes rapidly and/or when high torque magnitudes are used, a wheel skid tends to be more likely. Improving the torque capacity (such as of high torque change rates and/or high torque magnitudes) of a lock ring assembly may thus allow the lock ring assembly to more reliably transfer torque under a high torque change rate, at high torque magnitudes and/or at a high rate of speed.

While not intending to be bound by theory, lock ring assemblies having multiple torque paths between a wheel base and a side rim may reduce the tendency of a wheel assembly to encounter a wheel skid. Stated another way, multiple torque paths may increase the torque capacity of a lock ring assembly.

Systems and methods disclosed herein may be useful for lock ring assemblies. Although the embodiments herein are described with reference to lock ring assemblies used in connection with aircraft wheels, such embodiments are provided for example only as it is contemplated that the disclosures herein have applicability to other vehicles, such as for example, automobiles.

According to various embodiments, a method for assembling a wheel includes placing a wheel base inside a tire, the wheel base having an air seal seat. A side rim is placed inside the tire around the wheel base. The side rim may include a recess formed on an inside surface of the side rim. The side rim is moved on the wheel base to expose the air seal seat. An air seal is placed around the wheel base and inside the air seal seat. A lock ring assembly is inserted inside a cavity between the wheel base and the side rim, and the tire is inflated.

As described above, a lock ring assembly may transfer torque from a wheel base to a side rim. A wheel base and side rim together (whether with a lock ring assembly or without) may be referred to as a wheel assembly. In various embodiments, a lock ring assembly may comprise any number of lock rings, although in various embodiments a lock ring assembly comprises a single lock ring. A single lock ring as used herein may comprise a single unitary member. Thus, according to various embodiments, the lock ring does not comprise multiple pieces, such as a plurality of pieces coupled together or interfacing to form a locking mechanism.

Figure 2:
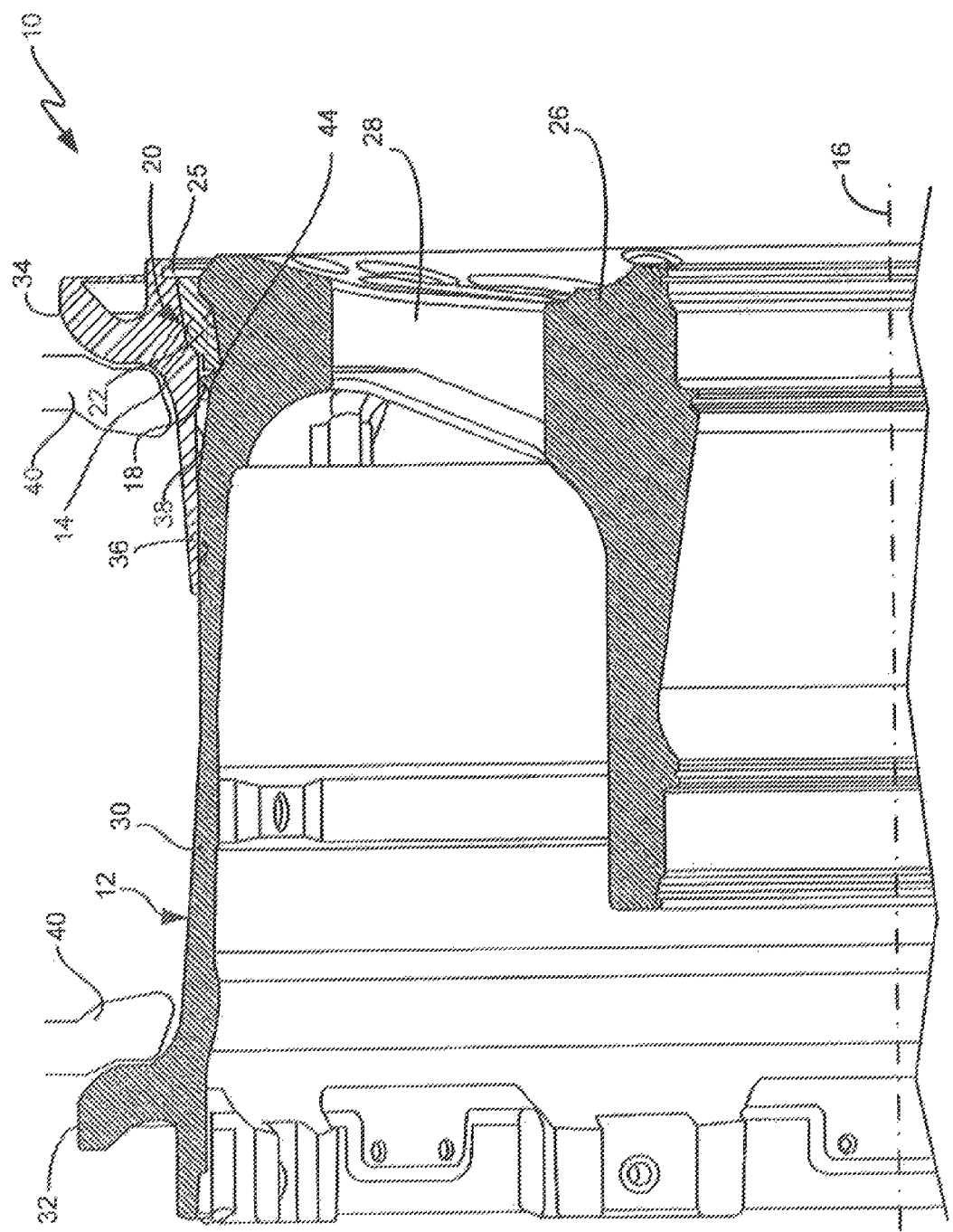
FIG. 2 illustrates a cross section of a wheel assembly, in accordance with various embodiments.

FIG. 1 is a perspective view of a wheel assembly 10 according to the present invention, and FIG. 2 is a cross-sectional view of the wheel assembly 10 of FIG. 1 taken along line A-A. Line A-A may define axis 16. Wheel assembly 10 includes wheel base 12, side rim 14, axis 16, air seal 18, cavity 20, lock ring 22, and retaining ring 25. In the embodiment of FIGS. 1 and 2, wheel base 12 includes hub 26, spokes 28, tubewell 30, and inboard flange 32. Side rim 14 includes outboard flange 34, inside surface 36, and recess 38. Wheel assembly 10 also includes tire 40.

Hub 26 is disposed radially inward from tubewell 30 and is the point of contact between an axle of an aircraft or vehicle and wheel assembly 10. Spokes 28 extend radially outward from hub 26 and connect tubewell 30 to hub 26. When wheel assembly 10 is mounted onto an aircraft or any other vehicle, inboard is defined as the direction facing towards the center of the aircraft or vehicle structure and outboard is defined as the direction facing outward or away from the center of the aircraft or vehicle structure. In this embodiment, inboard and outboard refer to specific directions, but in alternate embodiments, they may be reversed. Inboard flange 32 is disposed on tubewell 30 and extends radially outward from tubewell 30 and extends axially inboard. Side rim 14 is disposed around the circumference of tubewell 30 opposite inboard flange 32. Side rim 14 is coaxial with wheel base 12, both being centered about axis 16. Outboard flange 34 extends radially outward from side rim 14 and extends axially outboard. Tire 40 is disposed around tubewell 30 between inboard flange 32 and outboard flange 34. Inside surface 36 of side rim 14 faces tubewell 30 of wheel base 12. Recess 38 is formed on inside surface 36. Cavity 20 is disposed between side rim 14 and tubewell 30 of wheel base 12 and houses lock ring 22 when wheel assembly 10 is assembled. Retaining ring 25 axially retains lock ring 22 inside cavity 20. Air seal 18 is disposed circumferentially around tubewell 30 of wheel base 12 and is disposed between tubewell 30 of wheel base 12 and inside surface 36 of side rim 14. Air seal 18 interfaces with air seal seat 44 on an outside surface of wheel base 12. In the embodiment of FIGS. 1 and 2, air seal 18 is an O-ring.

In response to lock ring 22 being correctly assembled and/or oriented inside cavity 20, lock ring 22 acts as a locking mechanism to prevent side rim 14 from sliding axially outboard off wheel base 12. In response to lock ring 22 being correctly assembled and/or oriented inside cavity 20, lock ring 22 transmits torque from wheel base 12 to side rim 14, such that side rim 14 rotates in unison with wheel base 12. As disclosed below in the description of FIGS. 3 and 7-12, lock ring 22 forms multiple contact points and torque pathways between wheel base 12 and side rim 14, thereby reducing the probability of wheel-skid occurring between wheel base 12 and side rim 14. The discussion in the Background section describes wheel-skid and why it is undesirable. These contact points may be non-contiguous. Non-contiguous as used herein may comprise a break between engagement with a surface when viewed along a cross-sectional plane, such as the perspective depicted in FIG. 3. Additionally, in response to lock ring 22 being correctly assembled inside cavity 20, air seal 18 engages inside surface 36 of side rim 14 and tubewell 30 of wheel base 12, preventing air from leaking out of wheel assembly 10 between side rim 14 and wheel base 12 as tire 40 is inflated. In response to lock ring 22 being incorrectly installed, suffering from fatigue and/or failure within inside cavity 20, side rim 14 moves axially outboard relative to wheel base 12 such that inside surface 36 disengages air seal 18, thereby allowing air to leak out of wheel assembly 10 between side rim 14 and wheel base 12.

Figure 3:
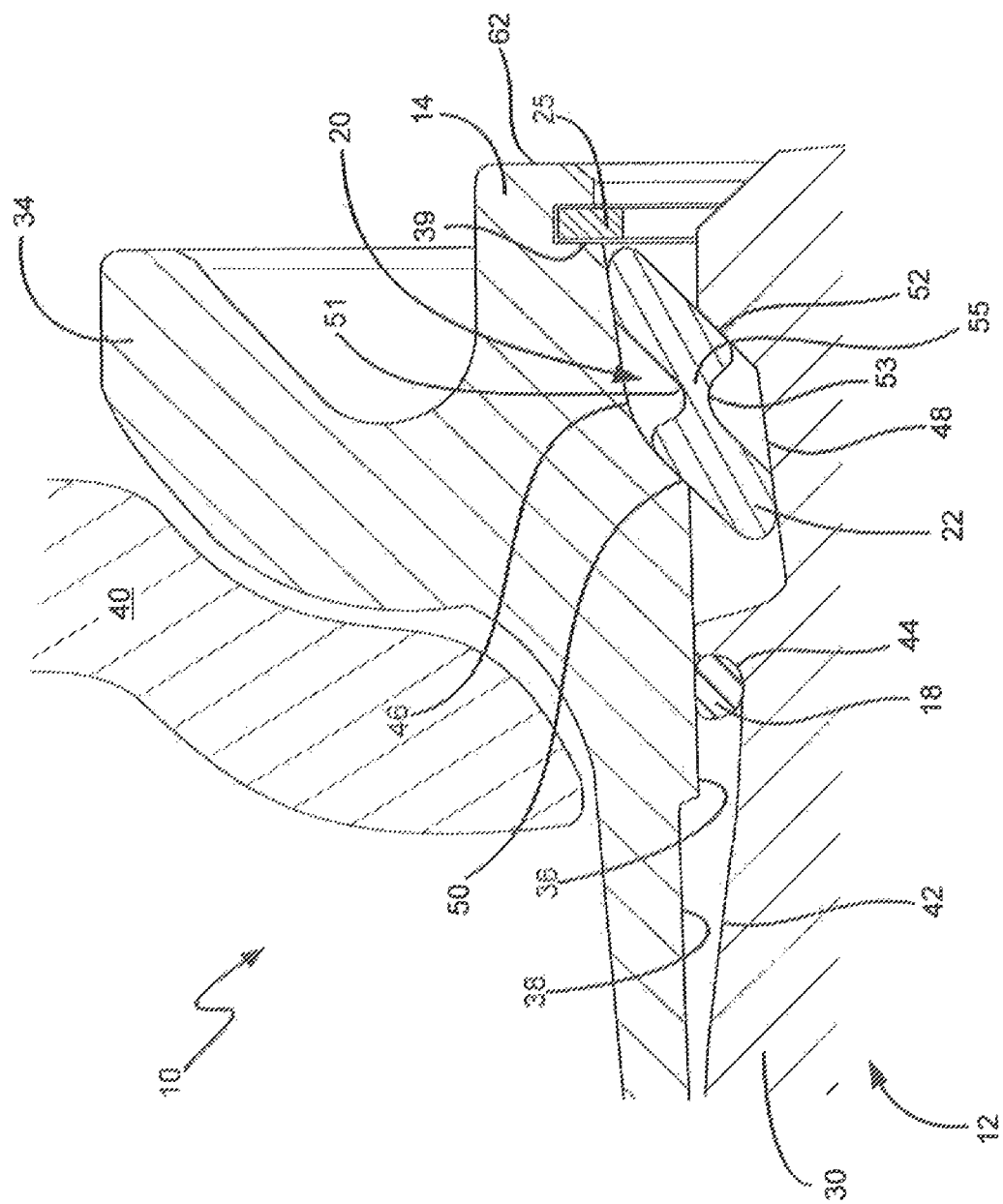
FIG. 3 illustrates an enlarged view of the cross section of the wheel assembly of FIG. 2, in accordance with an exemplary embodiment.

FIG. 3 is an enlarged cross-sectional view of wheel assembly 10 of FIG. 1, showing an exemplary embodiment of lock ring 22. The cross-sectional views of FIGS. 3 and 7-12 are along a plane passing through an axis 16 of rotation of the wheel base. Wheel assembly 10 includes wheel base 12, side rim 14, air seal 18, cavity 20, lock ring 22, and retaining ring 25. In the various embodiments depicted in FIGS. 3 and 7-12, wheel base 12 includes tubewell 30, tapered surface 42, and air seal seat 44. Side rim 14 includes outboard flange 34, inside surface 36, optional recess 38, and retaining ring groove 39. Cavity 20 includes top surface 46, bottom surface 48, first side surface 50, and second side surface 52. In general, in the embodiment of FIGS. 3 and 7-12, wheel assembly 10 also includes tire 40 and air. According to various embodiments, top surface 46 is substantially parallel to bottom surface 48.

In FIGS. 3 and 7-12, components of like numbering with the components of FIGS. 1 and 2 are assembled as discussed above with reference to FIGS. 1-2. Tapered surface 42 is formed in tubewell 30 of wheel base 12 and extends radially inward as it extends axially outboard towards cavity 20. Tapered surface 42 stops short of cavity 20 and does not extend into cavity 20. Air seal seat 44 is disposed at an outboard end of tapered surface 42 and is cut to match the shape of air seal 18. Top surface 46 of cavity 20 is formed on inside surface 36 of side rim 14. Bottom surface 48 of cavity 20 is formed on tubewell 30 of wheel base 12. Top surface 46 is parallel to bottom surface 48. First side surface 50 of cavity 20 is formed on inside surface 36 of side rim 14 and extends between inside surface 36 and top surface 46. Second side surface 52 of cavity 20 is formed on tubewell 30 of wheel base 20. Second side surface 52 of cavity 20 extends radially upward and axially outboard from bottom surface 48 of cavity 20. In the embodiment of FIGS. 3 and 7-12, first side surface 50 is substantially parallel to second side surface 52.

The locking mechanism described herein may be a lock ring, such as lock ring 22. Though it may have any desired shape, according to various embodiments depicted herein lock ring 22 comprises a cross-sectional profile that is generally "Z" shaped. The lock ring 22 may be a generally circular lock ring or a split lock ring. This circular lock ring may have an axis at its center.

Lock ring 22 may comprise fillets and/or chamfers, such as fillets 51, 53 and chamfers 61, 63. These fillets may reduce the stress concentration of portions of the wheel assembly and/or the torque pathways. The fillets 51, 53 distribute the stress experienced by lock ring 22 over a broader area and effectively make lock ring 22 more durable and capable of bearing larger loads. The design size and shape of these fillets 51 and 53 may vary according to performance desires. The size and shape of fillets 51 and 53 each may be the same or be different.

Figure 4:
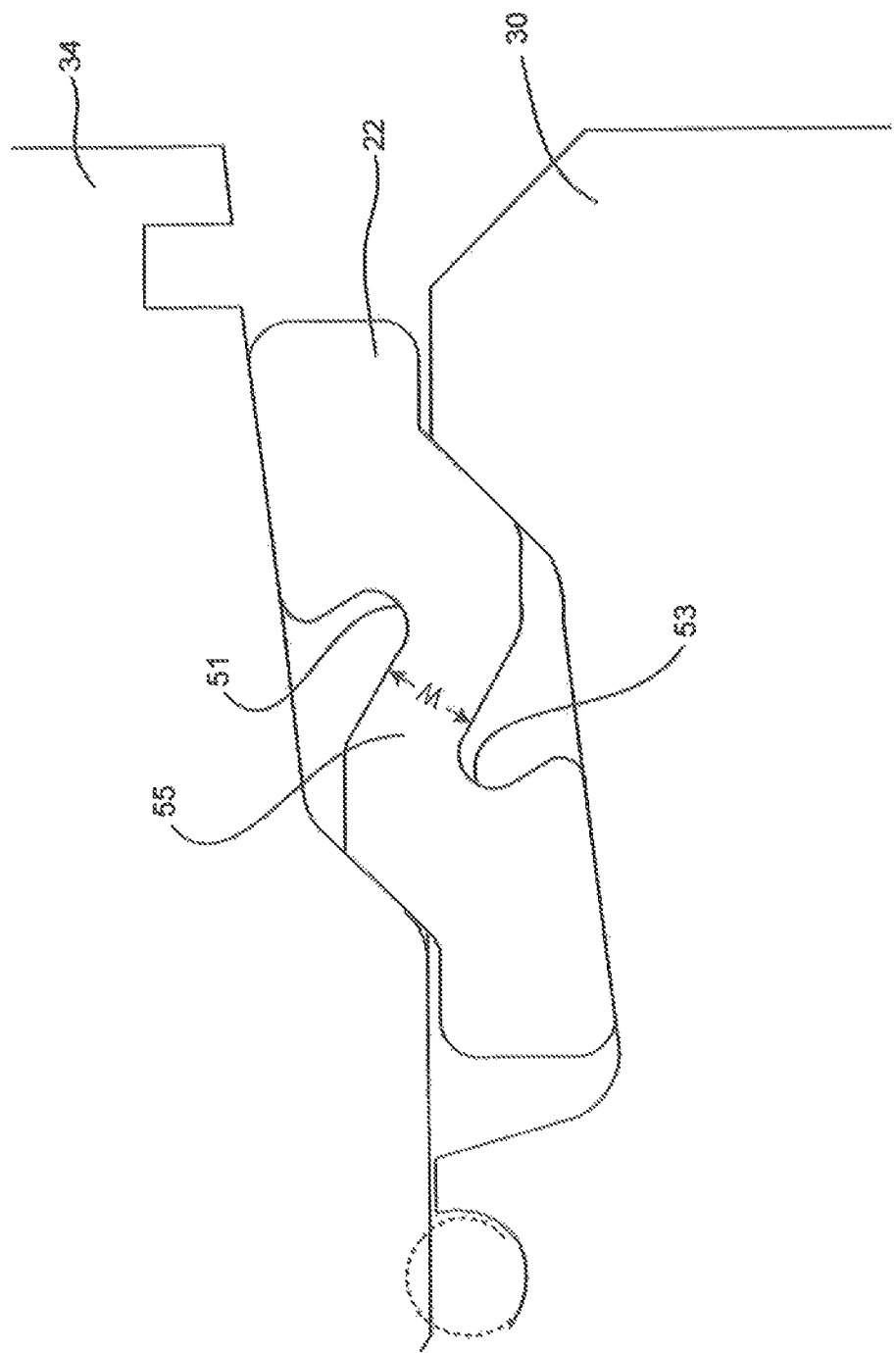
FIG. 4 illustrates a view of the cross section of the wheel assembly of FIG. 2 depicting width "W", in accordance with various embodiments.

Generally, interposed between fillets 51 and 53 is a transfer path 55 of lock ring 22 which aids in the transfer of torque from wheel base 12 to side rim 14. Note transfer path 55 is not the only transfer path for torque. As described further herein, any path between one or more contact surfaces through lock ring 22 may be a transfer path of torque. Stated another way, generally interposed between first side surface 50 and second side surface 52 is transfer path 55. This transfer path 55 may be configured to aid in the flexibility of the functionality of lock ring 22. Flexibility may allow non-parallel friction surfaces of wheel halves and/or wheel assembly elements to be better mated for surface contact to improve part-to-part friction, to resist relative rotation. Flexibility may allow portions of lock ring 22 to twist if needed. For instance, and with reference to FIG. 4, as the width "W" of transfer path 55 is decreased, the flexibility of lock ring 22 is increased. Conversely, as the width "W" of transfer path 55 lock ring 22 becomes more robust and the fatigue life of lock ring 22 is extended. The width "W" of transfer path and/or the size and dimensions of fillets 51 and 53 may be selected to provide a desired amount of torque transfer. For instance, according to various embodiments, lock ring 22 may be designed such that the friction coefficient between the wheel halves is greater than the friction between wheel halves and tire 40.

In response to lock ring 22 being correctly installed inside cavity 20, lock ring 22 contacts bottom surface 48 and first side surface 50 of cavity 20. Lock ring 22 also contacts top surface 46 and second side surface 52 of cavity 20. Because lock ring 22 is contacting both side rim 14 (at first side surface 50 and at top surface 46) and wheel base 12 (at bottom surface 48 and at second surface 52), lock ring 22 comprises various torque pathways between wheel base 12 and side rim 14.

Figure 5:
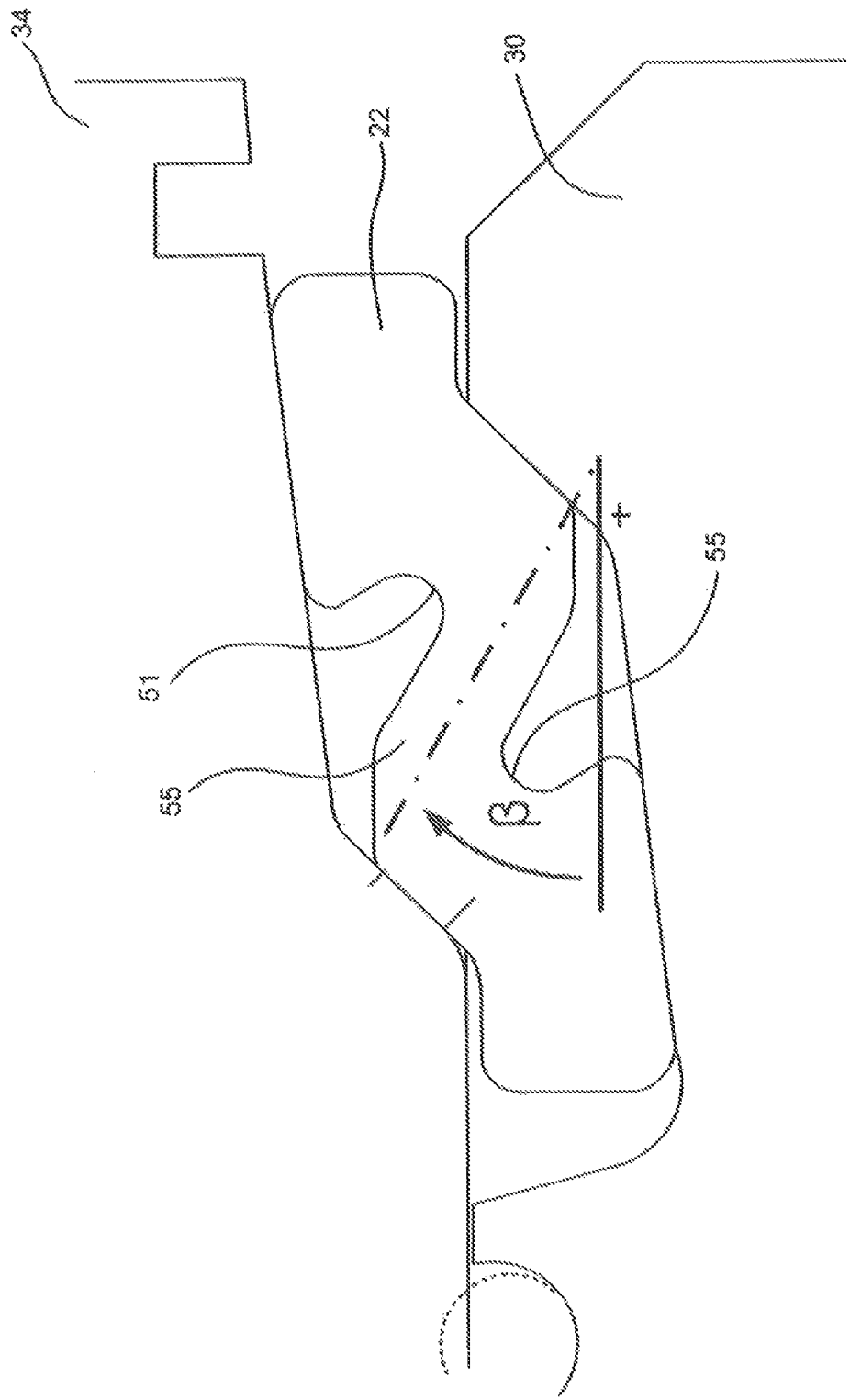
FIG. 5 illustrates a view of the cross section of the wheel assembly of FIG. 2 depicting angle beta "β", in accordance with various embodiments.

With reference to FIG. 5, an exemplary angle β of transfer path 55 relative to a reference plane is depicted. This angle and related orientation of transfer path 55 may be any desired angle. As angle β is reduced, the torque capacity of lock ring 22 may be decreased. As angle β is increased, the torque capacity of the lock ring 22 may be increased. As the angle β continues to increase and approaches 90 degrees, functionality may be adversely affected as lock ring 22 may more easily be improperly wedged within cavity 20 in an undesirable orientation.

Figure 6:
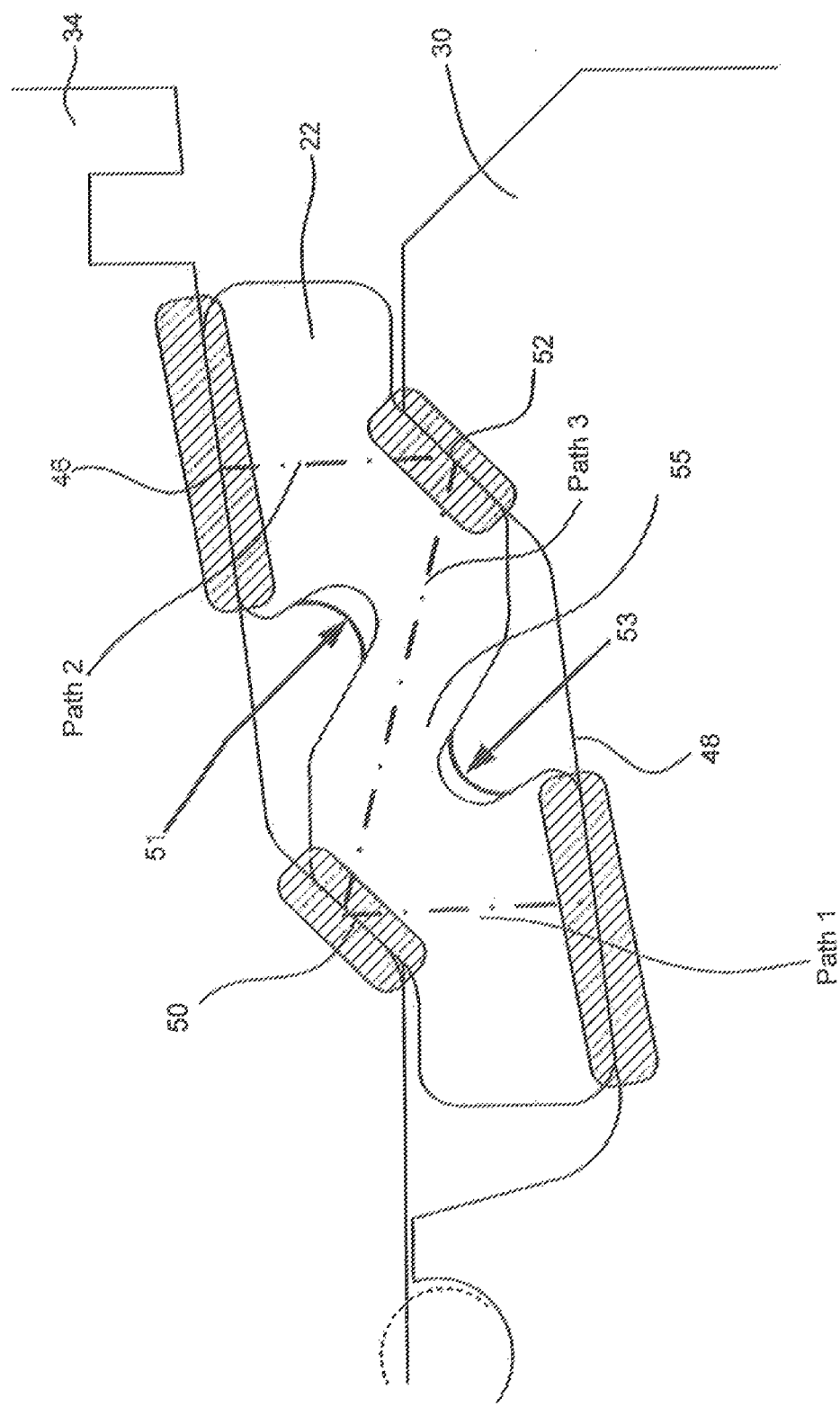
FIG. 6 illustrates a view of the cross section of the wheel assembly of FIG. 2 depicting various engagement surfaces, in accordance with various embodiments.

According to various embodiments, and with reference to FIG. 6, a correctly installed lock ring 22 contacts bottom surface 48, second side surface 52, top surface 46 and first side surface 50 of cavity 20. Any path between wheel base 12 and side rim 14 may be a torque pathway. For instance, a torque pathway may be from bottom surface 48 through lock ring 22 to first side surface 50 (path 1). A torque pathway may be from bottom surface 48 through lock ring 22 to top surface 46. A torque pathway may be from second side surface 52 through lock ring 22 to top surface 46 (path 2). A torque pathway may be from second side surface 52 through lock ring 22 to first side surface 50 (path 3).

Additionally, torque pathway may be from first side surface 50 through lock ring 22 to bottom surface 48. A torque pathway may be from top surface 46 through lock ring 22 to bottom surface 48. A torque pathway may be from top surface 46 through lock ring 22 to second side surface 52. A torque pathway may be from first side surface 50 through lock ring 22 to second side surface 52.

Similarly, in various embodiments a torque pathway may be formed through a combination of contact with various surfaces. For instance, a torque pathway may be from bottom surface 48 through lock ring 22 to a combination of first side surface 50 and top surface 46. A torque pathway may be from second side surface 52 through lock ring 22 to a combination of first side surface 50 and top surface 46. A torque pathway may be from first side surface 50 through lock ring 22 to a combination of bottom surface 48 and second side surface 52. A torque pathway may be from top surface 46 through lock ring 22 to a combination of bottom surface 48 and second side surface 52. A torque pathway may be from one or a combination of first side surface 50 and/or top surface 46 through lock ring 22 to one or a combination of bottom surface 48 and/or second side surface 52.

Optimizing torque transfer capacity of lock ring 22 (between side rim 14 and wheel base 12) may be achieved by appropriately proportioning the surface contact stress among the primary interface contact surfaces, such as the four primary interface contact surfaces of lock ring 22 along first side surface 50, second side surface 52, top surface 46 and/or bottom surface 48. For instance, the relative horizontal locations of first side surface 50 and second side surface 52 will contribute to the control of the width between flanges dimension of portions of wheel assembly 10 and/or lock ring 22. The relative vertical locations of bottom surface 48 and top surface 46 will determine the amount of mechanical interference between lock ring 22 and wheel base 12 at bottom surface 48, and lock ting 22 and side rim 14 at top surface 46. The amount of interference, and the thickness of lock ring 22, will help to determine the amount of normal force, and surface contact stress, at each of these interfaces. Allocating the normal forces and friction appropriately via designing the amount of interference will help ensure the existence and efficiency of multiple paths of torque transfer between the wheel halves (side rim 14 and wheel base 12) through lock ring 22.

The contact surfaces along lock ring 22 which individually interface with each of first side surface 50, top surface 46, bottom surface 48 and second side surface 52 may be non-contiguous and discrete with respect to each other. For instance, lock ring 22 may comprise a fillet, such as fillet 51 and 53, between a pair of contact surfaces. Stated another way, lock ring 22 may comprise a fillet, such as fillet 51 being located between a pair of contact surfaces, such as between first side surface 50 and top surface 46. Similarly, lock ring 22 may comprise a fillet, such as fillet 53 being located between a pair of contact surfaces, such as between second side surface 52 and bottom surface 48. Fillet 51, 53 surfaces do not contact side rim 14 and/or wheel base 12.

With continued reference to FIG. 3, in response to lock ring 22 being correctly assembled inside cavity 20, lock ring 22 axially limits the outboard travel of side rim 14 with respect to wheel base 12 when the tire 40 is pressurized. In response to air seal 18 contacting inside surface 36, air inside of tire 40 is unable to escape out of wheel assembly 10 between side rim 14 and wheel base 12. An operator who is assembling wheel assembly 10 can detect proper assembly of lock ring 22 inside wheel assembly 10 when the operator fills wheel assembly 10 with air and wheel assembly 10 remains pressurized and retaining ring 25 can be installed inside retaining ring groove 39 on side rim 14.

The distance between first side surface 50 and second side surface 52 as generally measured through lock ring 22 controls the width between the flanges of wheel assembly 10. The relative vertical locations of bottom surface 48 and top surface 46 to each other determines the amount of interference of lock ring 22 to rim 14 and wheel base 12 in the inflated condition. Thus, the relative vertical locations of bottom surface 48 and top surface 46 to each other and the geometry of lock ring 22 determines the amount of surface contact stress at the contacting interfaces. In response to proportioning the contact stresses at the interfacing locations appropriately, multiple paths of frictional torque transfer from wheel base 12 to side rim 14 results.

Figure 7:
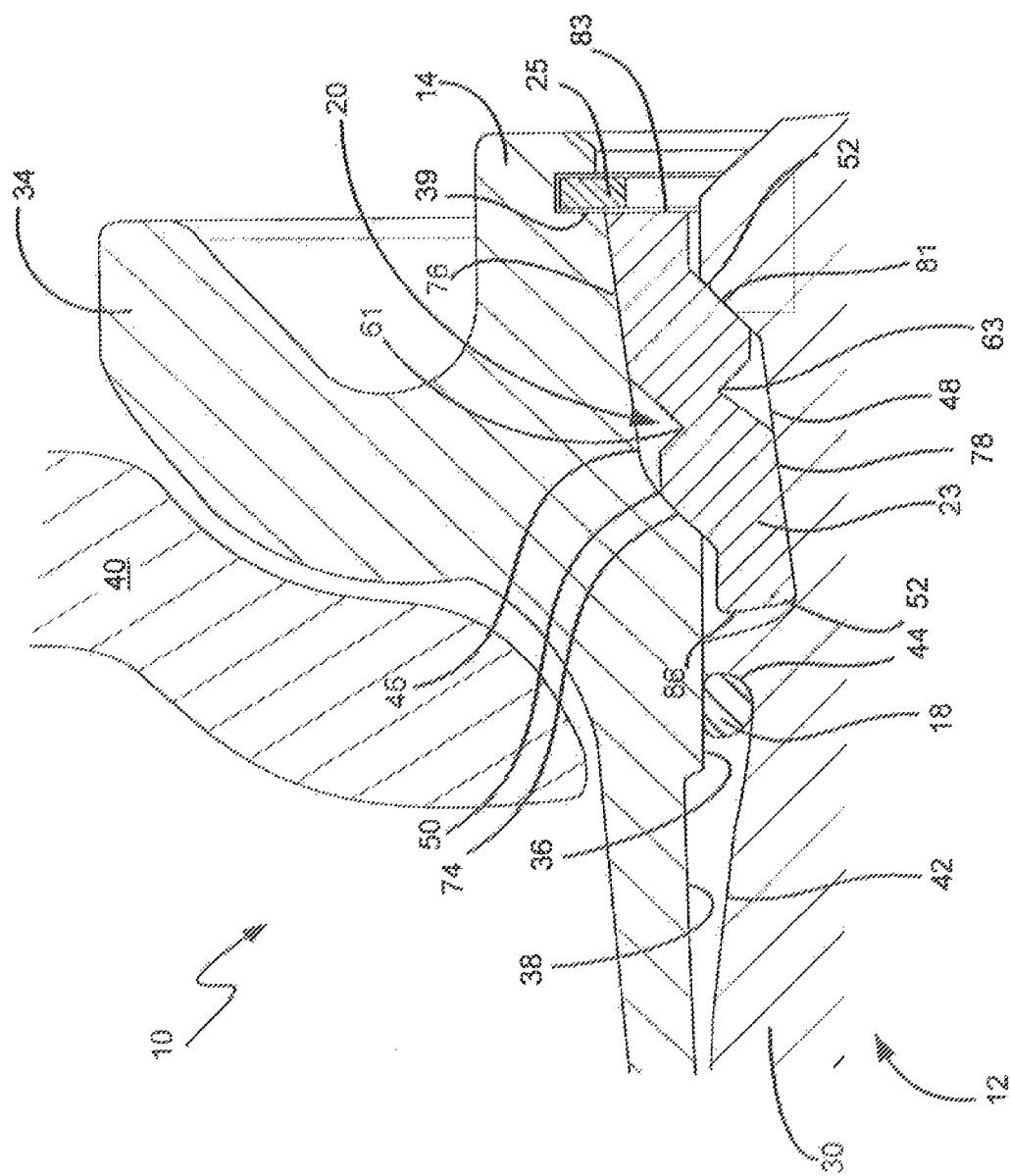
FIGS. 7-10 illustrate enlarged views of the cross section of the wheel assembly of FIG. 2 having different cross-sectional orientations, in accordance with an various embodiments.

A large number of permutations of lock ring cross-section are possible, with a sampling of various embodiments shown in FIGS. 3 and 7-12. FIG. 7 is an enlarged cross-sectional view of wheel assembly 10 with an exemplary embodiment of lock ring 23. Cavity 20 includes top surface 46, bottom surface 48, first side surface 50, and second side surface 52. Lock ring 23 includes mating surfaces for contacting top surface 46, bottom surface 48, first side surface 50, and second side surface 52 within cavity 20. For instance, lock ring 23 of FIG. 7 comprises a first surface 78, a chamfer 63, a second surface 81, a third surface 83, a fourth surface 76, a chamfer 61, a fifth surface 74 and a sixth surface 86. At least a portion of first surface 78 is configured to interface with bottom surface 48. At least a portion of second surface 52 is configured to interface with second side surface 52. At least a portion of fourth surface 76 is configured to interface with top surface 46. At least a portion of fifth surface 74 is configured to interface with first side surface 50. Chamfer 63 is oriented between first surface 78 and second surface 81. Third surface 83 is located between second surface 81 and fourth surface 76. Chamfer 61 is oriented between fourth surface 76 and fifth surface 74. Sixth surface 86 is located between fifth surface 74 and first surface 78. The symmetrical nature of lock ring 23 of FIG. 7 may assist with the manufacture and of lock ring 22.

According to various embodiments, and with continued reference to FIG. 7 and as discussed above, lock ring 23 may comprise a notch, such as chamfers 61 and 63, between two contact surfaces. This notch may comprise any desired geometric shape. Chamfer 61 may be located between first side surface 50 and top surface 46. Similarly, chamfer 63 may be located between second side surface 52 and bottom surface 48. The angle of chamfer 61 and/or 63 may be any desired angle. As shown, though they need not be the same, chamfers 61 and 63 are each approximately 45 degrees.

Figure 8:
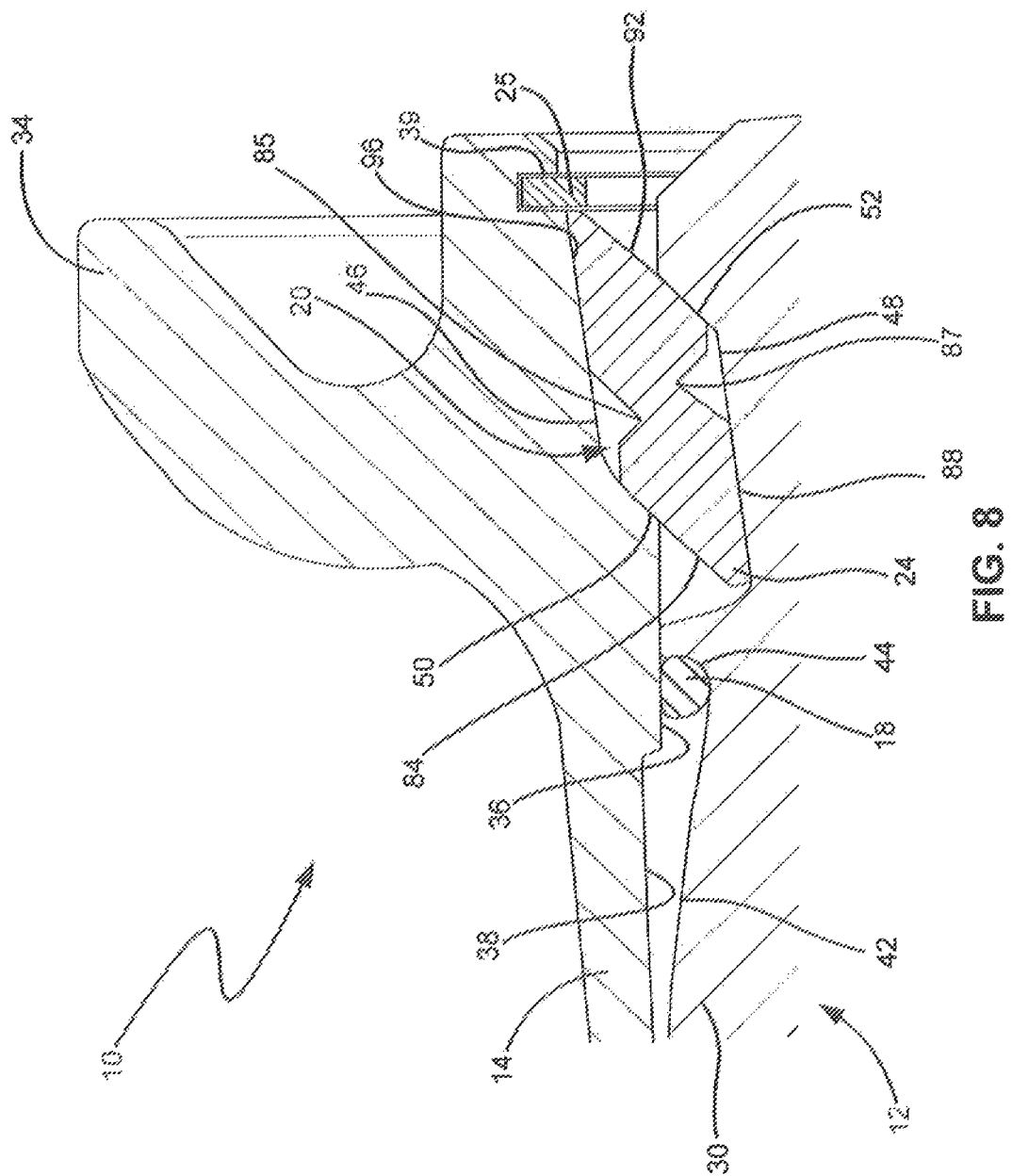

FIG. 8 is an enlarged cross-sectional view of wheel assembly 10 with another embodiment of lock ring 24. In FIG. 8, components of like numbering with the components of prior described Figures are as discussed above. In the embodiment of FIG. 8, cavity 20 includes top surface 46, bottom surface 48, first side surface 50, and second side surface 52. Lock ring 24 comprises a first surface 88, a second surface 92, a third surface 96, and a fourth surface 84. Lock ring 24 of FIG. 8 further comprises chamfer 85 and chamfer 87.

With continued reference to FIG. 8, lock ring 24 is disposed inside cavity 20 such that at least a portion of fourth surface 84 contacts first side surface 50 of cavity 20, and at least a portion of first surface 88 contacts bottom surface 48 of cavity 20. Also, lock ring 24 is disposed inside cavity 20 such that at least a portion of second surface 92 contacts second side surface 52 of cavity 20 and at least a portion of third surface 96 contacts top surface 46 of cavity 20. Chamfer 85 is located at a selected distance between fourth surface 84 and third surface 96. Chamfer 87 is located at a selected distance between first surface 88 and second surface 92.

Figure 9:
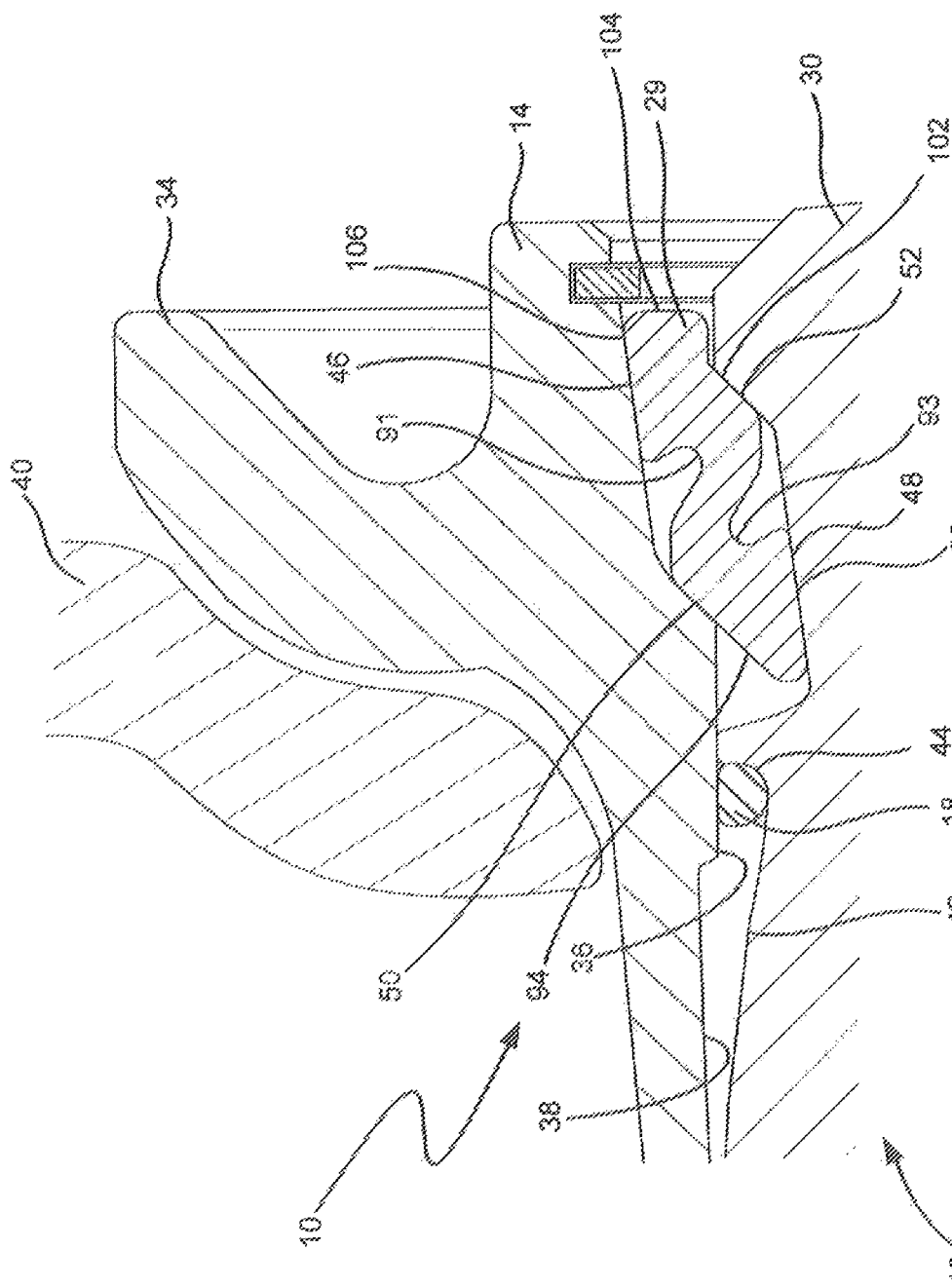

FIG. 9 is an enlarged cross-sectional view of wheel assembly 10 including lock ring 29 according to various embodiments. In FIG. 9, components of like numbering with the components of prior described Figures are assembled and configured as discussed above. Lock ring 29 of FIG. 9 comprises a first surface 98, fillet 93, a second surface 102, a third surface 104, a fourth surface 106, a fillet 91, and a fifth surface 94. When viewed along a cross section, at least a portion of first surface 98 is configured to interface with bottom surface 48. Similarly, at least a portion of second surface 102 is configured to interface with second side surface 52. Also, at least a portion of fourth surface 106 is configured to interface with top surface 46. Similarly, at least a portion of fifth surface 94 is configured to interface with first side surface 50. Fillet 93 is oriented between first surface 98 and second surface 102. Third surface 104 is located between second surface 102 and fourth surface 106. Fillet 91 is oriented between fourth surface 106 and fifth surface 94. The visual difference of the inboard portion of lock ring 29 as compared with the outboard portion of lock ring 29 may assist with proper construction of the wheel assembly.

Figure 10:
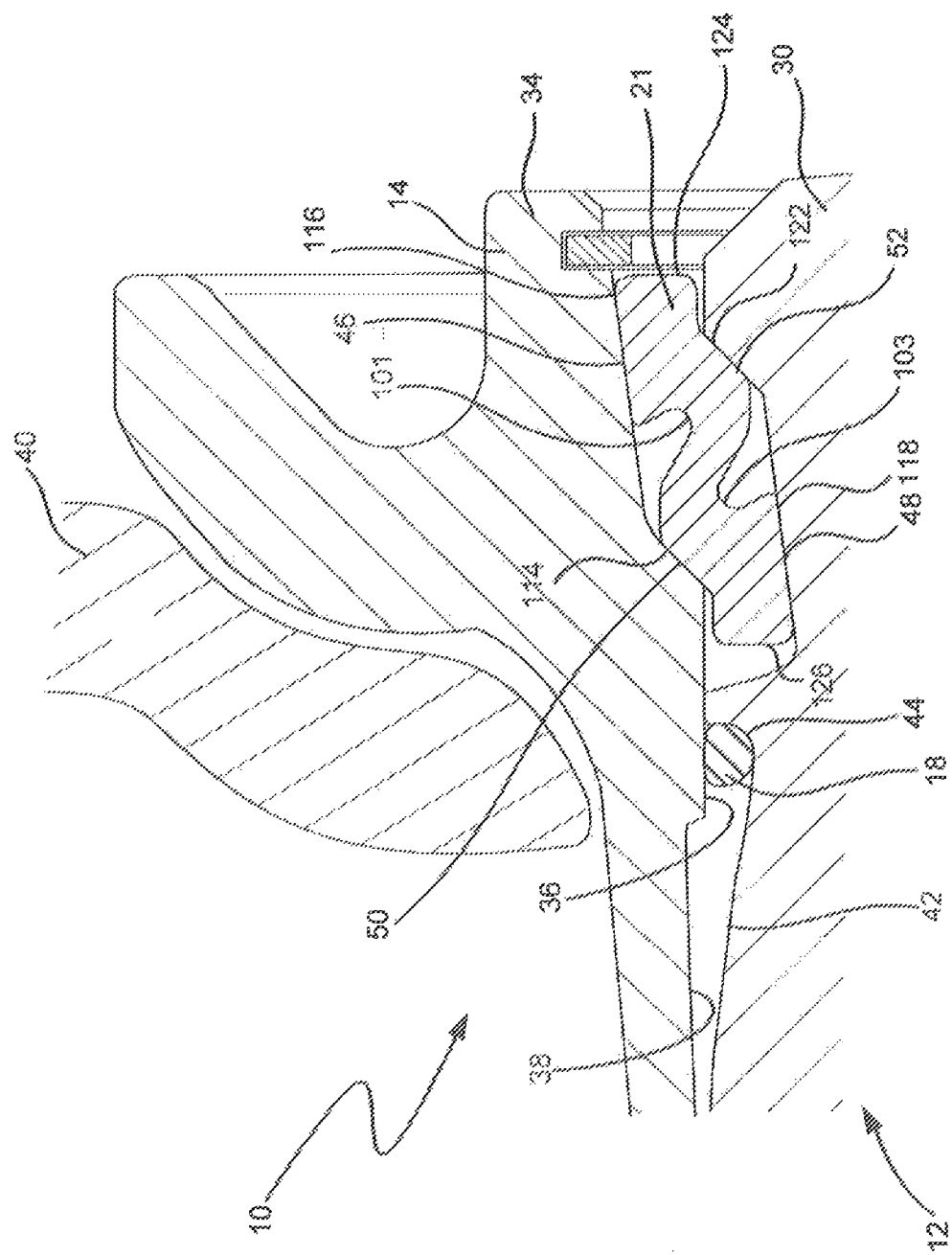

FIG. 10 is an enlarged cross-sectional view of wheel assembly 10 including lock ring 21 according to various embodiments. In FIG. 10, components of like numbering with the components of prior described Figures are assembled and configured as discussed above. Lock ring 21 of FIG. 10 comprises a first surface 118, fillet 103, a second surface 122, a third surface 124, a fourth surface 116, a fillet 101, a fifth surface 114 and a sixth surface 126. At least a portion of first surface 118 is configured to interface with bottom surface 48. At least a portion of second surface 122 is configured to interface with second side surface 52. At least a portion of fourth surface 116 is configured to interface with top surface 46. At least a portion of fifth surface 114 is configured to interface with first side surface 50. Fillet 103 is oriented between first surface 118 and second surface 122. Third surface 124 is located between second surface 122 and fourth surface 116. Fillet 101 is oriented between fourth surface 116 and fifth surface 114. Sixth surface 126 is located between fifth surface 114 and first surface 118. The symmetrical nature of lock ring 21 of FIG. 10 may assist with the manufacture and of lock ring 21.

Figure 11:
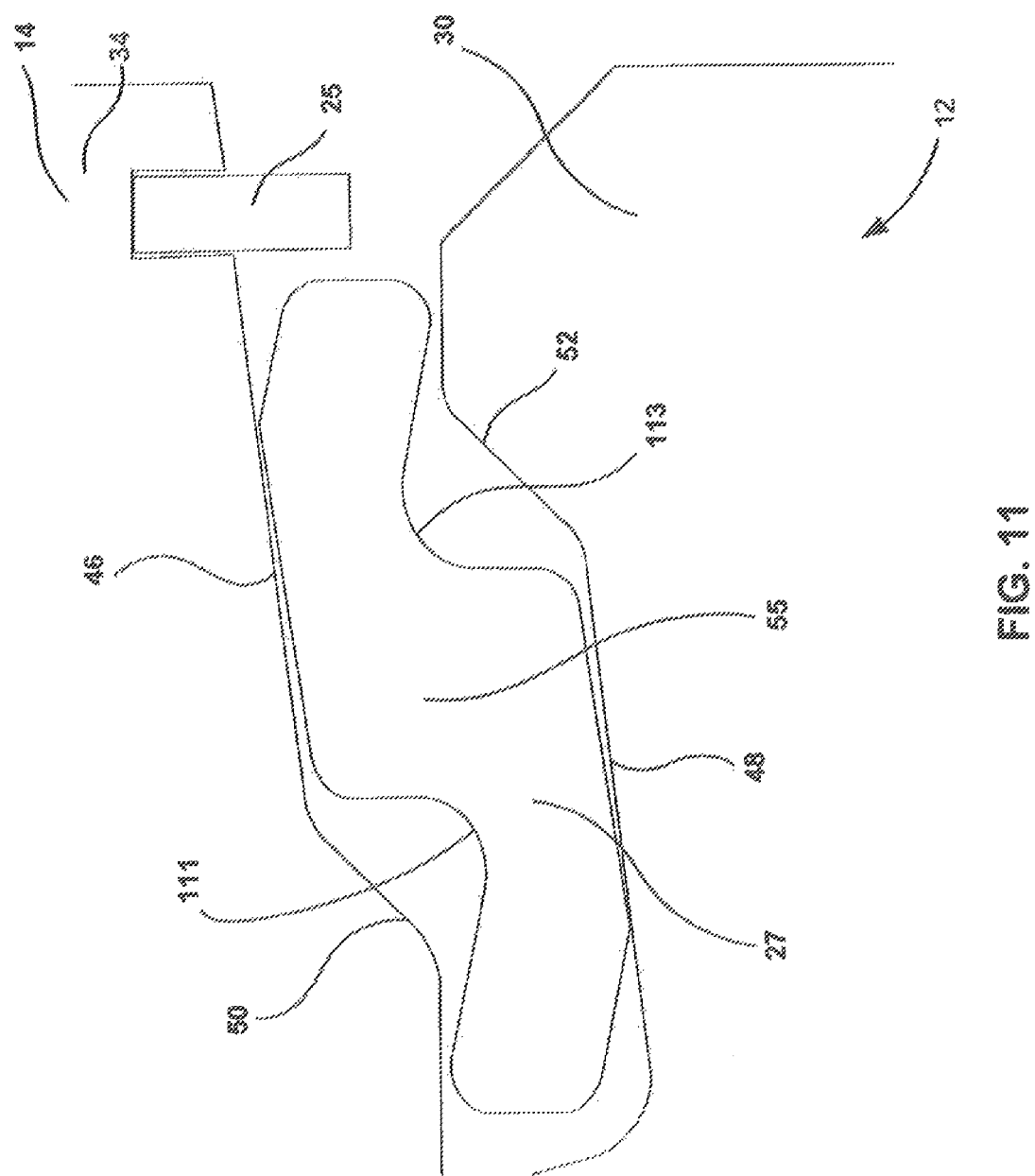
FIGS. 11-12 illustrate views of the cross section of the wheel assembly of FIG. 2, in accordance with various cam locking embodiments.

FIG. 11 is an enlarged cross-sectional view of wheel assembly 10 including lock ring 27 according to various embodiments. In FIG. 11, components of like numbering with the components of prior described Figures are assembled as discussed above. Lock ring 27 may be a "cam locking" lock ring. Lock ring 27 may comprise fillets, 111 and 113. As tire 40 is inflated side rim 14 may move outboard. The center section of lock ring 27, including transfer path 55, will "cam up" to create another torque transmitting friction path through lock ring 27. For instance, lock ring 27 of FIG. 11, may not be engaging with one or more of bottom surface 48, second side surface 52, top surface 46 and/or first side surface 50 until tire 40 is inflated and side rim 14 is compressed towards wheel base 12.

Figure 12:
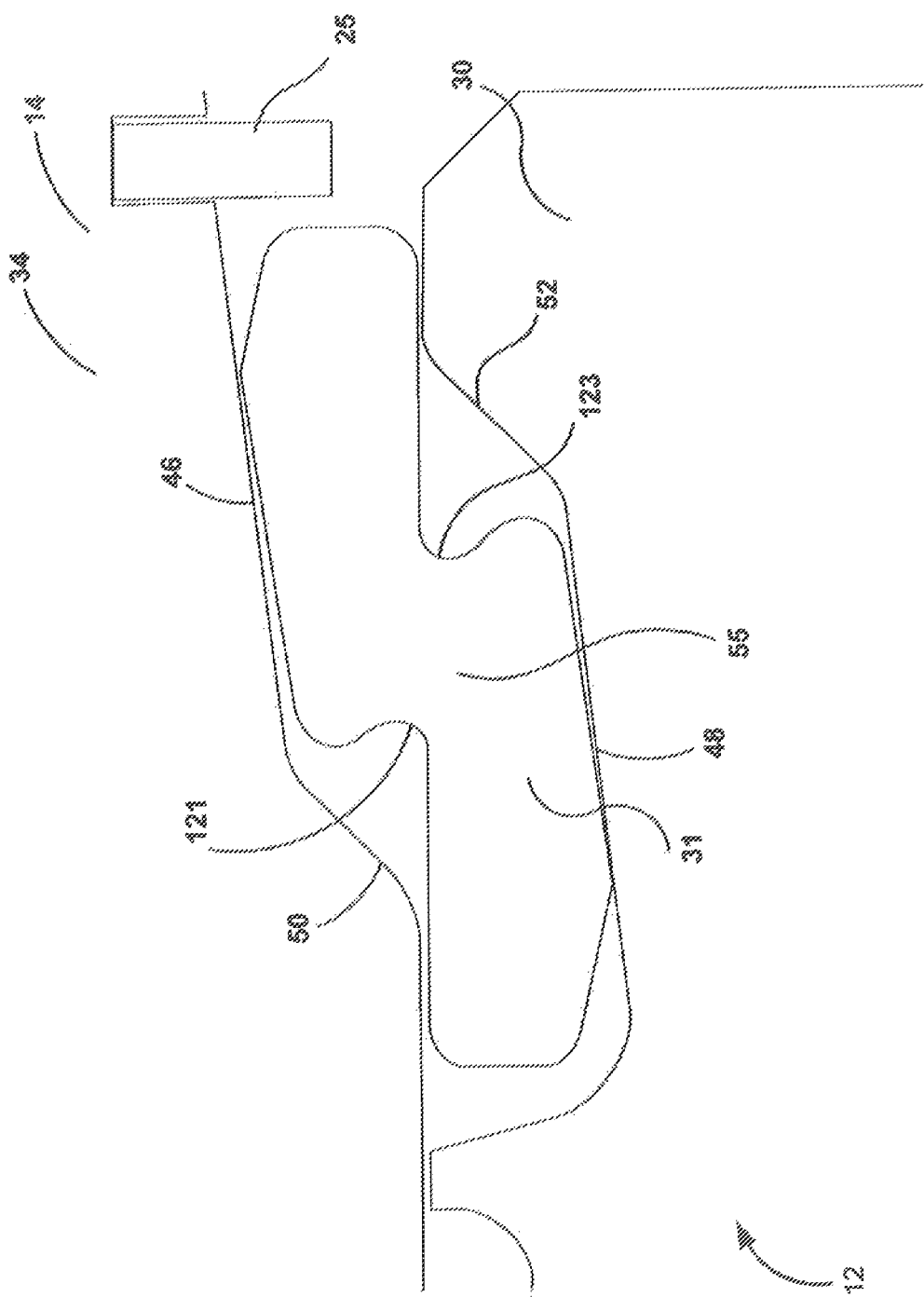

FIG. 12 is an enlarged cross-sectional view of wheel assembly 10 including lock ring 31 according to various embodiments. In FIG. 12, components of like numbering with the components of prior described Figures are assembled as discussed above. Lock ring 31 of FIG. 12 may be a cam locking lock ring. Lock ring 31 may comprise fillets, 121 and 123. As tire 40 is inflated side rim 14 may move outboard. The center section of lock ring 31, including transfer path 55, will "cam up" to create another torque transmitting friction path through lock ring 31. For instance, lock ring 31 of FIG. 12, may not be engaging with one or more of bottom surface 48, second side surface 52, top surface 46 and/or first side surface 50 until tire 40 is inflated and side rim 14 is compressed towards wheel base 12.

Figure 13:
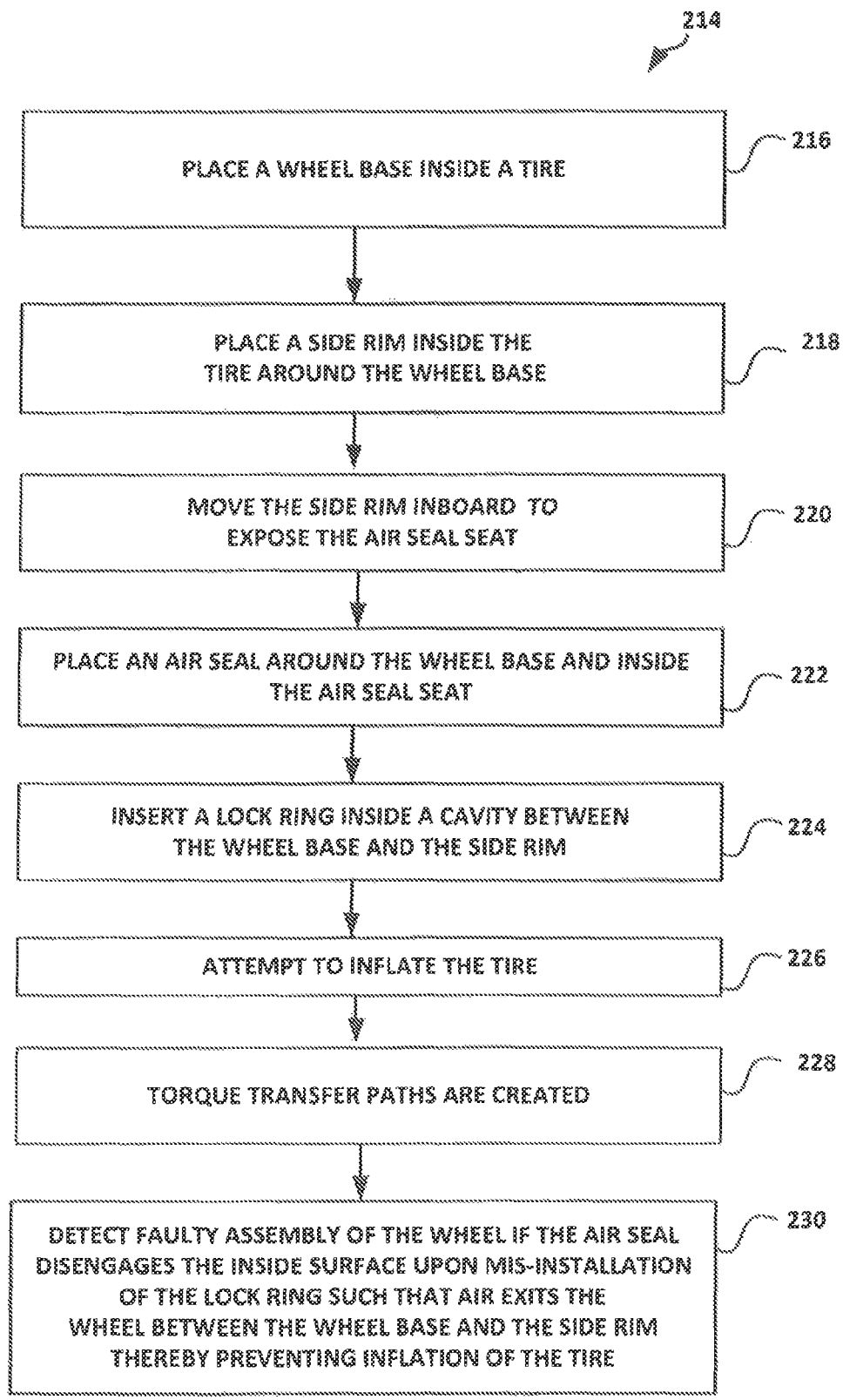
FIG. 13 discloses a diagram of a method for producing a wheel assembly, in accordance with various embodiments.

FIG. 13 discloses a diagram of method 214, which begins with placing a wheel base inside a tire (step 216). The wheel base includes an air seal seat. A side rim is placed inside the tire around the wheel base (step 218). The side rim includes a recess formed on an inside surface of the side rim. The side rim is moved inboard on the wheel base to expose the air seal seat (step 220). An air seal is placed around the wheel base and inside the air seal seat (step 222). A lock ring assembly, such as lock ring, is inserted inside a cavity between the wheel base and the side rim (step 224). The tire is inflated (step 226). Torque transfer paths are created through the lock ring via discrete non-contiguous interfaces within the cavity (step 228). Faulty assembly of the wheel may be detected if the air seal disengages, or fails to engage, the inside surface upon mis-installation of the lock ring assembly and/or due to lock ring suffering from fatigue and/or structural failure such that air exits the wheel between the wheel base and the side rim thereby preventing inflation of the tire (step 230).

In view of the foregoing description, it will be recognized that the present disclosure provides numerous advantages and benefits. For example, the present disclosure provides wheel assembly with lock ring 22 between wheel base 12 and side rim 14. Lock ring 22 provides more torque pathways between wheel base 12 and side rim 14 than conventional wheel assemblies. Because lock ring 22 provides more toque pathways between wheel base 12 and side rim 14, the probability of wheel-skid is reduced. Furthermore, side rim 14 includes recess 38 which allows air to escape wheel assembly 10 in response to lock ring 22 not being properly installed between wheel base 12 and side rim 14. Because wheel assembly 10 is unable to remain pressurized when lock ring 22 is incorrectly installed, the probability that wheel assembly 10 will be incorrectly assembled and subsequently used is reduced.

In addition, while not intending to be bound by theory, it is believed that a lock ring that has a different frictional potential between the lock ring and two adjacent structures may improve the lock ring's ability to transmit torque while reducing the likelihood of wheel skids. Stated another way, in accordance with various embodiments, a lock ring may have a greater frictional potential between the lock ring and a wheel base than the frictional potential between the lock ring and a side rim. The structure that has a greater frictional potential with a lock ring may be referred to as the lock ring's "preferred mating member." For example, a wheel base may be referred to as a lock ring's preferred mating member when the lock ring has a greater frictional potential between the lock ring and the wheel base than the frictional potential between the lock ring and the side rim.

The frictional potential of the lock ring assembly may be controlled by the size and nature of the surface contact between a lock ring and a wheel base or side rim. In addition, the frictional potential between a lock ring and a wheel base or side rim may be controlled by selection of surface coatings or other characteristics of the lock ring.

Multiple torque paths (such as that shown in FIG. 6) may increase the torque capacity of the lock ring assembly.

Lock ring 22 may comprise any suitable material. For example, lock ring 22 may be comprised of an aluminum alloy such as 2024 (extruded), 7075 (extruded), 2024 (plate), 7075 (plate), and/or 4026. Both 2024 and 7075 may be produced by extrusion. It should be noted that any temper of an aluminum alloy is contemplated herein, such as 2024T3 (extruded) and 7075T6 (extruded). Lock ring 22 may also be comprised of steel and/or a poly matrix composite (PMC).

Lock ring 22 may be mechanically treated. For example, lock ring 22 may be treated by shot peening. Shot peening may comprise the forceful application of shot (e.g., beads or pellets) against a substrate (e.g., a lock ring). Also for example, lock ring 22 may be treated by roller burnishing.

Lock ring 22 may comprise a surface coating. For example, lock ring 22 may be coated with polytetrafluoroethylene (PTFE) (TEFLON) and/or molybdenum disulfide. Moreover, lock ring 22 may be anodized (e.g., using sulfuric acid). Surface coatings may be selected based upon cost, durability, frictional characteristics, and other like considerations.

In various embodiments, lock ring 22 may be nondeformable or minimally deformable. As used herein, nondeformable or minimally deformable may refer to a material that is nondeformable or minimally deformable to a degree where measurement of deformity is difficult under the range of expected operating forces in a wheel assembly. For example, a nondeformable or minimally deformable material may be a material that is nondeformable or minimally deformable under the forces exerted by an inflated tire and/or the weight of an aircraft. Further, a nondeformable or minimally deformable lock ring may be nondeformable or minimally deformable material about a cross section under the forces typically exerted by an inflated tire and/or the weight of an aircraft. A lock ring made from a nondeformable or minimally deformable material may be made to become more deformable through the application of particular geometric cross sections. Stated another way, a lock ring made from a nondeformable or minimally deformable material may be made to exhibit certain characteristics of a deformable material by selection of geometric cross sections that are amenable to deformation under the forces typically exerted by an inflated tire and/or the weight of an aircraft.

According to various embodiments, a compliant cross section of lock ring 22 that allows controlled deflection and conformity under axial loads from inflation pressures and radial loads from the weight of the aircraft, which promotes surface contact, rather than line or point contact, between lock ring 22 and both wheel halves (wheel base 12 and side rim 14) may be utilized. The compliant cross section may be configured to allow lock ring 22 to wedge itself into the pocket between wheel base 12 and side rim 14 to effectively reduce or eliminate the functional clearance between the two wheel halves (wheel base 12 and side rim 14) to create a more efficient frictional interface between the inboard and outboard wheel halves (wheel base 12 and side rim 14). The single lock ring 22 design provides mechanical connectivity between the inboard portion and outboard portion of lock ring 22. This single lock ring 22 design is easier to manufacture, store and ship, as compare with a dual lock ring 22 design as there is only one lock ring 22 component per wheel assembly 10. This single lock ring 22 is simpler to prepare for installation into the wheel assembly 10, because no masking is required for surface treatment application. The new single lock ring 22 design is easier to properly assemble into the wheel assembly 10, because there is only one lock ring Component per wheel assembly 10. Lock ring 22 may comprise indicator to visually assist an operator in correctly assembling lock ring 22 inside cavity 20. As an example, an inboard surface 56 and/or outboard surface 54 may comprise text such as "outboard," "inboard" and/or arrows or text, such as "To Side Rim" depicting correct orientation of lock ring 22 inside cavity 20. Alternatively, an inboard surface 56 and/or outboard surface 54 may be marked with a color indicator to assist with orientation of lock ring 22.

Lock ring 22 design has tunable design features that allow a reasonable balance to be achieved between performance (torque capacity) and durability (fatigue life). The tunable design features include ample surface contact areas between side rim 14 and lock ring 22; ample surface contact areas between wheel base 12 and lock ring 22; selectable fillet radii, a selectable angle "β" and a selectable width "W."

According to various embodiments, a method of fabrication of lock ring 22 includes extruding a bar of material thru a die to produce the desired cross sectional shape, and then form rolling it to the proper diameter. This process could take different paths, depending on the capabilities of the supplier, and two examples of slightly differing process are described as follows:

The bars could be extruded to some standard length, long enough to produce at least one or more finished lock ring, then straightened, with or without heat treat, cut to appropriate length to produce a finished lock ring, then roll formed into a circular form to create lock ring 22. Finishes and coatings for environmental and wear protection may then be applied. The bars may be extruded onto a cylindrical mandrel made to the proper diameter for a finished lock ring creating a thread-like form on the outer diameter of the mandrel until the billet material in the extrusion machine is exhausted, or the amount of rolled extruded bar on the mandrel reaches the desired amount for any multiple quantity of finished lock rings. The mandrel could have physical features that mate with the contours of the lock ring cross section to allow the extrusion to consistently wind onto the mandrel, and prevent the extruded shape from twisting. The coiled extrusion may be heat treated and then cut to proper lengths prior to application of finishes and coatings for environmental and wear protection.

Reducing the weight of lock ring 22 reduces the overall weight of wheel assembly 10 and increases the fuel efficiency of any vehicle that utilizes wheel assembly 10. The fillets and/or chamfers discussed herein may reduce the weight of a lock ring as compared with lock rings with no fillet and/or chamfer. As used herein, the phrases "make contact with", "touch", "interface with" and "engage" may be used interchangeably. Different cross-hatching is used throughout the figures to denote different parts but not necessarily to denote the same or different materials.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. As used herein, the term adjacent may mean in close proximity to, but does not necessarily require contact. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A wheel assembly comprising:
   a wheel base;
   a side rim disposed about a circumference of the wheel base, wherein the side rim includes an inside surface; and
   a lock ring that secures the side rim onto the wheel base, the lock ring preventing the side rim from sliding axially off the wheel base, wherein the lock ring comprises four discrete non-contiguous interfaces with interior surfaces of the wheel base and the side rim, wherein the lock ring comprises a single unitary member
   wherein the lock ring is a cam lock ring which engages in response to a tire inflation.

2. The wheel assembly of claim 1, wherein torque transfer paths are created through the lock ring via the discrete non-contiguous interfaces.

3. The wheel assembly of claim 1, wherein the lock ring is marked with an indicator to assist with wheel assembly construction.

4. The wheel assembly of claim 1, wherein a torque transfer capacity of the lock ring is optimized by proportioning surface contact stress among the four discrete non-contiguous interfaces with interior surfaces of the wheel base and the side rim.

5. The wheel assembly of claim 1, wherein a faulty lock ring is indicated in response to an air seal disengaging the inside surface.

6. The wheel assembly of claim 1, wherein the lock ring comprises at least one fillet between two of the non-contiguous interfaces.

7. The wheel assembly of claim 6, wherein the lock ring comprises a cross-sectional profile that is generally Z shaped.

8. The wheel assembly of claim 1, wherein the lock ring is comprised of a deformable material.

9. The wheel assembly of claim 1, wherein the lock ring comprises at least one chamfer between two of the non-contiguous interfaces.

10. The wheel assembly of claim 1, wherein the lock ring is coated with at least one of a polytetrafluoroethylene and molybdenum disulfide surface coating.

11. The wheel assembly of claim 1, wherein the lock ring comprises four discrete non-contiguous interfaces with interior surfaces of the wheel base and the side rim, as viewed along a cross-section of the lock ring oriented along a plane passing through an axis of rotation of the wheel base.

12. The wheel assembly of claim 9, wherein the lock ring is comprised of a material comprising at least one of steel, a poly matrix composite and an aluminum alloy.

13. The wheel assembly of claim 1, wherein the wheel assembly comprises a cavity including a bottom surface formed on the wheel base and a top surface formed on the inside surface of the side rim, the top surface being substantially parallel to the bottom surface.

14. The wheel assembly of claim 13, wherein the cavity includes a first side surface formed on the inside surface of the side rim and a second side surface formed on the wheel base, the first side surface being substantially parallel to the second side surface.

15. The wheel assembly of claim 14, wherein the bottom surface, the first side surface, the top surface and the second side surface of the cavity respectively contact the lock ring via the four discrete non-contiguous interfaces.

16. A method for assembling a wheel assembly, the method comprising:
- placing a wheel base inside a tire, the wheel base having an air seal seat;
- placing a side rim inside the tire around the wheel base;
- moving the side rim on the wheel base to expose the air seal seat;
- placing an air seal around the wheel base and inside the air seal seat;
- inserting a lock ring inside a cavity between the wheel base and the side rim, the lock ring comprising four discrete non-contiguous interfaces with interior surfaces of the wheel base and the side rim, wherein the lock ring comprises a single lock ring, wherein the lock ring is a cam lock ring which engages in response to a tire inflation; and
- inflating the tire.

17. The method of claim 16, wherein torque transfer paths are created through the lock ring via the discrete non-contiguous interfaces.

18. The method of claim 16, wherein the lock ring comprises at least one of a fillet and a chamfer between two of the non-contiguous interfaces.

19. A wheel assembly comprising:
- a wheel base;
- a side rim disposed about a circumference of the wheel base, wherein the side rim includes an inside surface; and
- a lock ring that secures the side rim onto the wheel base, the lock ring preventing the side rim from sliding axially off the wheel base, wherein the lock ring comprises four discrete non-contiguous interfaces with interior surfaces of the wheel base and the side rim, wherein the lock ring comprises a single unitary member,
wherein a torque transfer capacity of the lock ring is optimized by proportioning surface contact stress among the four discrete non-contiguous interfaces with interior surfaces of the wheel base and the side rim.

* * * * *